United States Patent Office 3,410,848
Patented Nov. 12, 1968

3,410,848
2-(β-HALO)-VINYL-3 ALKYLAZOLIUM COMPOUNDS
Emil B. Rauch, Port Dickinson, and John A. Welsh, Binghamton, N.Y., assignors to GAF Corporation, a corporation of Delaware
No Drawing. Filed July 13, 1965, Ser. No. 471,723
9 Claims. (Cl. 260—240)

This invention relates to 2-(β-halo)-vinyl-3-alkyloxazolium compounds, their preparation and use in the preparation of unsymmetrical meso oxacarbocyanines.

U.S. Patent 2,231,659 discloses the preparation of 2-(β-halo)-vinyl-3-alkylthiazolium compound and 2-(β-halo)-vinylselenazolium compound of the structure

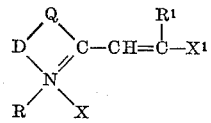

wherein D represents a divalent ortho arylene group, Q is sulfur or selenium, R is an alkyl group, $R^1$ is an alkyl or aryl group and X and $X^1$ are halogen. The process comprises reacting a phosphorous oxyhalide with an acylmethylene compound of the structure

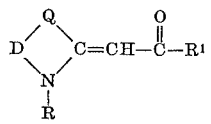

wherein D, Q, R and $R^1$ have the above meaning. This patent does not disclose the preparation of the corresponding 2-(β-halo)-vinyl-3-alkyloxazolium compounds. To the best of our knowledge there is no prior art disclosure indicating that the corresponding acylmethyleneoxazoles can be prepared. Accordingly, the method described in U.S. Patent 2,231,659 cannot be utilized to prepare 2-(β-halo)-vinyl-3-alkyloxazolium compounds. As set forth below in greater detail, the 2-(β-halo)-vinyl-3-alkyloxazolium compounds represent a class of compounds which are very useful in the preparation of meso oxacarbocyanine dyes, particularly the unsymmetrical types.

The literature is replete with descriptions of techniques of forming cyanine dyes of all types. Until now there has been no commercially attractive route disclosed for the preparation of unsymmetrical meso oxacarbocyanine dyes. The commercially preferred route for preparing unsymmetrical meso carbocyanine dyes has been by the condensation of 2-methylthiazolium or 2-methylselenazolium compounds with active 2-(β-substituted)-vinyl-3-alkylthiazolium or selenazolium compounds. These reactions are described below in the equations numbered I and II.

I
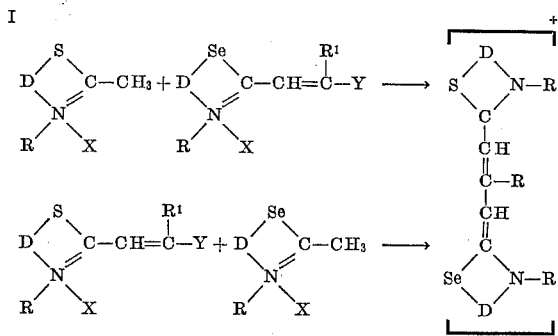

wherein D, R, $R^1$ and X are as defined above and Y is either —S—alkyl, halogen, or a sulfonate group. In the above reactions it is immaterial which pair of starting material is used since the same dye is formed. Until now, meso oxacarbocyanine dyes have not been prepared by this route since, on the one hand, 2-methyloxazolium compounds are too inactive to react with active 2-(β-substituted)vinylthiazolium or selenazolium compounds. On the other hand, the corresponding active 2-(β-substituted)-vinyl-3-alkyloxazolium compounds and their precursors have not previously been described in the literature. Accordingly, it can be said that it would be desirable to provide 2-(β-halo)-vinyl-3-alkyloxazolium compounds in order to ascertain whether said compounds are suitable unsymmetrical meso oxacarbocyanine dye intermediates.

Various references have disclosed methods of preparing unsymmetrical meso oxacarbocyanine dyes. However, as indicated above, these methods have not been satisfactory. For example, U.S. Patent 2,743,081 discloses reacting 2-methyloxazolium compounds with 2-acylmethylene-3-alkylthiazolium or selenazolium compounds. However, the reaction conditions are such that 2-acylmethylene-3-alkylthiazolium and selenazolium compounds are converted into the corresponding 2-methyl-3-alkylthiazolium and selenazolium compounds. Their decomposition products also react with the precursor 2-acylmethylenealkylthiazolium and selenazolium compounds. Accordingly, the final reaction product is a mixture of a symmetrical meso thiacarbocyanine (or meso selenacarbocyanine) and the desired unsymmetrical meso oxacarbocyanine. Because of these side reactions, the desired product is obtained in extremely low yields.

U.S. Patent 2,107,379 discloses the preparation of unsymmetrical meso oxacarbocyanine dyes by a process which comprises reacting the condensation product of isothioacetanilide and 2-methyl-3-alkyloxazolium salt with 2-methyl-3-alkylselenazolium or thiazolium compounds. Both steps of this process result in low yields of the desired product.

The object of this invention is to provide 2-(β-halo)-vinyl-3-alkyloxazolium compounds. Another object of this invention is to provide a method of preparing meso oxacarbocyanine dyes in good yields. A further object of this invention is to provide a method of preparing unsymmetrical meso oxacarbocyanine dyes in good yields. Other objects of this invention appear hereinafter.

In one aspect this invention relates to 2(β-halo)-vinyl-3-alkyloxazolium compounds of the structure

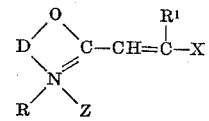

wherein D, R, $R^1$ and $X_1$ have the meaning set forth above and Z is an anion.

In a second aspect this invention is directed to a process of preparing 2-(β-halo)-vinyl-3-alkyloxazolium compounds by a process which comprises reacting a 2-acyl-methyl-3-alkyloxazolium compound with a phosphorus oxyhalide.

In a third aspect, this invention is directed to a process of preparing 2-(β-halo)-vinyl-3-alkyloxazolium compounds by a process which comprises quaternizing a 2-(β-halo)-vinyloxazole of the structure

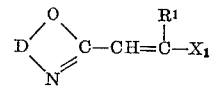

wherein D, $R^1$ and $X_1$ have the meaning set forth above.

In a fourth aspect this invention relates to a process of preparing meso oxacarbocyanines which comprises reacting a 2-methyl-3-alkylazolium compound with a 2-(β-halo)-vinyl-3-alkyloxazolium compound.

In a fifth aspect this invention relates to a process of preparing unsymmetrical meso oxacarbocyanines which comprises reacting a 2-(β-halo)-vinyl-3-alkyloxazolium compound with either a 2-methyl-3-alkylselenazolium compound, a 2-methyl-3-alkyloxazolium compound, or a 2-methyl-3-alkylthiazolium compound.

We have now found that 2-(β-halo)-vinyl-3-alkyloxazolium compounds having the structure

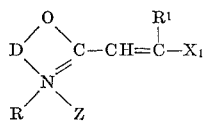

wherein D is a divalent ortho-arylene group, R is alkyl, $R^1$ is alkyl or aryl, $X_1$ is halogen and Z is an anionic group, are excellent intermediates for the preparation of meso oxacarbocyanine dyes, particularly unsymmetrical meso oxacarbocyanine dyes. These compounds react readily with 2-methyl-3-alkylazolium (oxazolium, thiazolium and selenazolium) compounds.

The 2-(β-halo)-vinyl-3-alkyloxazolium compounds can be prepared by reacting a 2-acylmethyl-3-alkyloxazolium compound with a phosphorus oxyhalide or by quaternizing a 2-(β-halo)-vinyloxazole. While either route can be employed advantageously, it is generally preferred to use the former route since higher yields of the desired halovinyloxazolium compounds are obtainable.

In somewhat greater detail, the former route comprises dissolving a suitable 2-acylmethyl-3-alkyloxazolium compound in a phosphorous oxyhalide, such as phosphorous oxychloride or phosphorus oxybromide. The sole criteria for carrying out the reaction is that the 2-acylmethyl-3-alkyloxazolium compound be soluble in the phosphorus oxyhalide. The reaction can be carried out at from about 0° C. to about 150° C. In some cases the reaction is mildly exothermic at room temperature and in other cases only mild heating is required in order to initiate the reaction.

Normally, the phosphorus oxyhalide and 2-acylmethyl-3-alkyloxazolium compound are used in equal molar concentration or phosphorus oxyhalide is used in excess.

Suitable 2-acylmethyl-3-alkyloxazolium compounds include the ethyl sulfate, p-toluene sulfonate, iodide, etc. salts of the following cations: 2-acetylmethyl-3-methylbenzoxazolium, 2-acetylmethyl-3-ethylbenzoxazolium, 2-acetylmethyl-3-methyl-5-chlorobenzoxazolium, 2 - acetylmethyl-3-ethyl-5,6-dimethylbenzoxazolium, 2-acetylmethyl-3-propylnaph (2.3) oxazolium, 2-chloroacetylmethyl-3-methylbenzoxazolium, 2-propionylmethyl-3-methylbenzoxazolium, 2-propionylmethyl-3-ethylbenzoxazolium, 2-propionylmethyl-3,5,6-trimethylbenzoxazolium, 2-propionylmethyl-3-ethylnaph (2.1) oxazolium, 2-stearoylmethyl-3-ethylnaph (1.2) oxazolium, 2-benzoylmethyl-3-methylbenzoxazolium, 2-benzoylmethyl - 3 - ethyl-5-phenylbenzoxazolium, 2 - benzoylmethyl-3-methyl-5-chlorobenzoxazolium, 2 - benzoylmethyl-3-ethyl-5-octylbenzoxazolium, 2 - (o,m,p) - toluylmethyl - 3 - methylbenzoxazolium, 2-(o,m,p) - chlorobenzoylmethyl-3-ethylbenzoxazolium, 2-benzoylmethyl-3-methylnaph (2.1) oxazolium, 2-naphthoylmethyl-3-methylbenzoxazolium, 2-acetylmethyl-5-(2'-thienyl) benzoxazolium, 2-propionylmethyl-5-(2'-thienyl) benzoxazolium, etc. These compounds can be prepared by quaternization of the corresponding 2-acylmethyl-oxazoles, as illustrated below, in the examples.

The second route for preparing the 2-(β-halo)-vinyl-3-alkyloxazolium compounds of our invention comprises quaternizing the corresponding 2-(β-halo)-vinyloxazole with alkyl esters of strong acids. In general the 2-(β-halo)-vinyloxazole and alkylating agent are mixed together and heated at a temperature of about 60 to 200° C. If desired a diluent may be added to the reaction mixture. Usually, it is preferred to employ equal molar quantities of reactants.

Representative 2-(β-hola)-vinyloxazoles, which are disclosed and claimed in our copending application filed on even date of this application, include: 2-(β-chloro-β-phenyl)-vinyl-5,6-dimethylbenzoxazolium, 2-(β-chloro-β-phenyl)-vinylbenzoxazole, 2 - (β-chloro-β-methyl)-vinyl-5,6-dimethylbenzoxazole, 2-(β-chloro - β - ethyl)-vinyl-5-chlorobenzoxazole, 2-(β-bromo - β - phenyl)-vinyl-5,6-dimethylbenzoxazole, 2-(β-phenyl-β-chloro-vinyl-5-phenylbenzoxazole, 2 - (β-naphthyl-β-chloro)-vinylbenzoxazole, 2-(β-methyl-β-chloro)vinylnaph (1.2) oxazole, etc.

The quaternizing agents used in our invention for quaternization of the 2-acylmethyloxazole and 2-(β-halo)-vinyloxazoles include alkyl esters of strong acids, such as alkyl esters of hydrohalic acids, alkyl esters of sulfonic acids (e.g., benzene, toluene and methane), alkyl esters of sulphuric acids, etc. Suitable alkylating agents include methyl iodide, ethyl iodide, methyl toluene sulfonate, ethyl toluene sulfonate, methyl sulfate, ethyl sulfate, methyl bromide, ethyl chloride, methyl benzene sulfonate etc. In general the alkyl esters of hydrohalic acids, toluene sulfonic acids and of sulfuric acids containing either one or two carbon atoms in the alkyl group are preferred. These alkylating agents react readily with oxazoles. However, the most advantageous alkylating agent for each oxazole is dependent upon the substituents on the oxazole ring.

In general, quaternization of 5-substituted-6-substituted-benzoxazoles with ethyl-para-toluene sulfonate must be carried out under careful conditions in order to prevent decomposition of the benzoxazole. Accordingly, it is preferred to use either ethyl iodide or ethylsulfate with the 5,6-disubstituted compounds in order to maximize the yield.

Irrespective of the method of preparation of the 2-(β-halo)-vinyl-3-alkyloxazolium compound, said compound is condensed with a cycloammonium quaternary salt to form a meso substituted oxacarbocyanine dye. Suitable cycloammonium salts correspond to the structure:

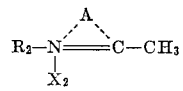

wherein $R_2$ represents an alkyl group, such as methyl, ethyl, carbethoxymethyl, carbomethoxymethyl, β-carbethoxyethyl, etc., $X_2$ represents an acid radical, such as chloride, bromide, iodide, benzenesulfonate, toluenesulfonate, ethyl sulfate, methyl sulfate, etc. and A represents the non-metallic atoms necessary to complete a heterocyclic nucleus containing from 5 to 6 atoms in the heterocyclic ring, such as those selected from the group consisting of those of the benzothiazole series (e.g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6 - iodobenzothiazole, 4 - ethoxybenzothiazole, 5-ethoxybenzothiazole, tetrahydrobenzothiazole, 5,6-dimethoxybenzothiazole, 5,6 - dioxymethylenebenzothiazole, 5 - hydroxybenzothiazole, 6 - hydroxybenzothiazole, etc.), those of the naphthothiazole series (e.g., naphtho[1,2]thiazole, naphtho[2,1]thiazole, 5-methoxynaphtho[2,1]5-ethoxynaphtho[2,1]thiazole, 8 - methoxynaphtho[1,2]thiazole, 7-methoxynaphtho[1,2]thiazole, etc.), those of the benzoxazole series (e.g., benzoxazole, 5-chlorobenzoxazole, 5-methylbenzoxazole, 5-phenylbenzoxazole, 6-methylbenzoxazole, 5,6 - dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), those of the naphthoxazole series (i.e., naphtho[1,2]oxazole, naphtho[2,1]oxazole, those of the benzoselenazole series (e.g., benzoselenazole, 5-chlorobenzoselenazole, 5-methoxybenzoselenazole, 5-hydroxybenzoselenazole, tetrahydrobenzoselenazole, etc.), those of the naphthoselenazole series (e.g., naphtho[1,2]selenazole, naphtho[2,1]selenazole, etc.), those of the 2-quinoline series (e.g., quinoline, 3-methylquinoline, 5-methylquinoline, 7-methylquinoline, 8-methylquinoline, 6-chloroquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), etc.

The reaction is preferably carried out in a polar solvent, such as an alcohol of 1 to 5 carbon atoms (methanol, isopropanol, pentanol), dioxane, etc. The dye condensation step can be carried out at from about 0–150° C. Preferably the temperature is maintained between 20–100° C., with the maximum reaction temperature being the reflux temperature of the reaction medium employed.

Normally, an organic base, which is soluble in the polar solvent, is employed as a catalyst to permit a rapid reaction. Suitable catalysts include trimethylamine, triethylamine, triethanolamine, tripropylamine, N,N-dimethylaniline, N,N-diethylaniline, N-methylpiperidine, etc. Of the various trialkylamines, triethylamine has given the best results.

The following examples are merely illustrative and should not be construed as limiting the scope of this invention.

Example I

This example illustrates the preparation of 2-($\beta$-chloro-$\beta$-phenyl)-vinyl - 3,5,6 - trimethylbenzoxazolium salts. Ten grams (0.0377 mole) of 5,6-dimethyl-2-benzoylmethylbenzoxazole and 7 grams (0.0377 mole) of methyl-p-toluene sulfonate were heated in a large test tube at 120° C. The clear yellow solution solidified after a short period of heating. The reaction mixture was cooled, triturated with ethyl ether-acetone, filtered and dried. Essentially a quantitive yield of 3,5,6-trimethyl-2-benzoylmethylbenzoxazolium p-toluene sulfonate having a melting point of 194 to 196° C. was obtained. After one recrystallization from isopropanol, yellow crystals having a melting point of 198 to 199° C. were obtained.

Two grams of 3,5,6-trimethyl-2-benzoylmethylbenzoxazolium p-toluene sulfonate and 15 ml. of phosphorus oxychloride were heated on a steam bath with occasional shaking in a test tube. After 60 minutes the test tube was cooled and ethyl ether was added precipitating a yellow solid. The solid material was filtered, washed with ethyl ether and then the somewhat hygroscopic p-toluene sulfonate salt was converted to the iodide salt by dissolving the hygroscopic salts in methanol and adding solution of potassium iodide precipitating the desired iodide salt. One and eight-tenths grams of 2-($\beta$-chloro-$\beta$-phenyl)-vinyl-3,5,6-trimethylbenzoxazolium iodide having a melting point of 197 to 198° C. was obtained. After one recrystallization from ethanol the compound had a melting point of 199 to 200° C.

Analysis.—$C_{18}H_{17}ClNOI$, percent: Calc., C, 50.78; H, 4.03; N, 3.29. Found: C, 50.86, 51.04; H, 4.08; 3.93; N, 3.47, 3.26.

Example II

This example illustrates the preparation of 2-($\beta$-chloro-$\beta$-phenyl)-vinyl-3-methylbenzoxazolium salts. The quaternization described in Example I was repeated using 10 grams (0.042 mole), 2-benzoylmethylbenzoxazole and 7.8 grams (0.042 mole) methyl-p-toluene sulfonate. Thirteen grams of 3-methyl-2-benzoylmethylbenzoxazolium p-toluene sulfonate was obtained.

The 3-methyl-2-benzoylmethylbenzoxazolium p-toluene sulfonate was converted to 2-($\beta$-chloro-$\beta$-phenyl)-vinyl-3-methylbenzoxazolium iodide in the manner described in the second paragraph of Example I using 4 grams of the precursor compound in 50 ml. phosphorus oxychloride. The semi-solid intermediate was dissolved in methanol and converted to the iodide by the addition of a solution of potassium iodide. Three grams of yellow crystalline ($\beta$-chloro-$\beta$-phenyl)-vinyl-3-methylbenzoxazolium iodide having a melting point of 202 to 203° C. was obtained.

Analysis.—$C_{16}H_{13}ClNOI$, percent: Calc., C, 48.32; H, 3.29; N, 3.51. Found: C, 48.38, 48.28; H, 3.08, 3.11; N, 3.47, 3.42.

Example III

This example illustrates the preparation of 2-($\beta$-chloro-$\beta$-phenyl)-vinyl-5,6-dimethyl-3-ethylbenzoxazolium salts. The quaternization described in Example I was repeated using 10 grams of 2-benzoylmethyl-5,6-dimethylbenzoxazole and 7.6 grams ethyl p-toluene sulfonate. The reactants were heated from 120 to 160° C. for about 110 minutes until a solid or semi-solid was formed. The material was cooled, and extracted with 250 ml. portion of dry benzene. Nine and six-tenths grams of 3-ethyl-5,6-dimethyl-2-benzoylmethylbenzoxazolium p-toluene sulfonate having a melting point of 198 to 199° C. was obtained.

Nine and four-tenths grams of the quaternary prepared in the preceding paragraph (0.02 mole) and 75 ml. of phosphorus oxychloride were shaken for 15 minutes in a stoppered flask and then heated on a steam bath for 60 minutes. After cooling an equal volume of dry ethyl ether precipitated a bright yellow solid which was filtered, washed with ethyl ether and dissolved in a small quantity of methanol. The methanol solution was treated with a 30% solution of potassium iodide resulting in precipitation of the iodide salt. Five and one-tenth grams of 2-($\beta$-chloro-$\beta$-phenyl)-vinyl-5,6-dimethyl-3-ethylbenzoxazolium iodide having a melting point of 203 to 204° C. was isolated.

Analysis.—$C_{19}H_{19}ClNOI$, percent: Calc., C, 51.89; H, 4.35; N, 3.18; I, 28.86. Found: C, 52.25; H, 4.28; N, 3.08, 2.92; I, 28.40, 28.69.

Example IV

This example illustrates the preparation of 2-[2-chloro propene(1)] - 3,5,6 - trimethylbenzoxazolium salts. The method described in Example I was repeated using 6 grams of 2-acetylmethyl-5,6-dimethylbenzoxazole and 5.58 grams methyl p-toluene sulfonate. The composition was heated to 130° C. for 15 to 20 minutes, cooled and sufficient ethyl ether was added to precipitate an off-white solid. Six grams of 2-acetylmethyl-3,5,6-trimethylbenzoxazolium p-toluene sulfonate having a melting point of 186 to 187° C. was obtained.

One and nine-tenths grams of the quaternary prepared in the preceding paragraph and 6 ml. of phosphorus oxychloride were heated over a steam bath for 60 minutes and then the unreacted phosphorus oxychloride was distilled under vacuum from the reaction zone. The residual red oil was treated several times with ethyl ether until a semi-solid was formed. This semi-solid was dissolved in methanol and a saturated solution of potassium iodide was added precipitating a tan solid. After washing with water, 1.04 grams of 2-[2-chloro propene(1)]-3,5,6-trimethylbenzoxazolium iodide having a melting point of 205 to 208° C. was obtained.

Analysis.—$C_{13}H_{15}ClNOI$, percent: Calc., N, 3.85. Found: N, 3.44, 3.53.

Example V

This example illustrates the preparation of 2-[2-chloropropene(1)]-3-ethyl-5,6-dimethylbenzoxazolium salt. The technique employed in Example I was repeated using 5 grams 2-acetylmethyl-5,6-dimethylbenzoxazole and 7.4 grams ethyl p-toluene sulfonate. The reactants were heated to 120° C. in a large test tube for 2 hours. A small portion of the reactants was removed and triturated with ethyl ether giving a little solid. The solid material was returned to the reaction medium which was still being heated at 120° C. More solid soon formed and the reaction medium became quite thick after a total elapsed heating time of 5 hours. The reaction medium was cooled and extracted with ethyl ether acetone to yield a yellow solid. Two grams of 2-acetylmethyl - 3 - ethyl - 5,6 - dimethylbenzoxazolium p-toluene sulfonate having a melting point of 157–158° C. was obtained.

Nine-tenths of a gram of the compound prepared in the preceding paragraph and 5 ml. of phosphorus oxychloride were heated on a steam bath for a few minutes, cooled and permitted to stand at room temperature for about 30 minutes. Ethyl ether was added to the reactants with stirring and more ether was added to the oil. After the ethyl ether was separated from the oil, the oil was dissolved in methanol and a saturated potassium iodide solution was then added from which a brown solid was obtained. Three-tenths grams of 2-[2-chloropropene-(1)]-5,6-dimethyl-3-ethylbenzoxazolium iodide having a melting point of 175–176° C. was obtained. Analysis for nitrogen gave yields of 3.67 and 3.73% nitrogen (theoretical nitrogen 3.72%).

Example VI

This example illustrates the preparation of 2-[2-chloropropene - (1)] - 3 - methylbenzoxazolium salts. One gram of 2 - acetylmethyl - 3 - methylbenzoxazolium-p - toluene sulfonate, which was prepared by reacting 2-acetylmethylbenzoxazole and methyl p - toluene sulfonate in the manner described in Example IV, was dissolved in 4 ml. phosphorus oxychloride. The solution was allowed to stand at room temperature for 60 minutes and then the excess phosphorus oxychloride was distilled off at room temperature under a vacuum. The oily residue was extracted with several portions of ethyl ether and then dissolved in 5 ml. of methanol from which it was precipitated by the addition of a saturated solution of potassium iodide in acetone. The brownish-yellow solid was filtered, washed with ethyl ether, boiled in a fresh portion of ethyl ether and filtered hot. The 2-[2-chloropropene-(1)] - 3 - methylbenzoxazolium iodide weighed 0.5 gram and had a melting point of 185–186° C.

*Analysis.*—$C_{11}H_{11}ClNOI$ percent: Calc., N, 4.18. Found: 4.13.

Example VII

This example illustrates the preparation of 2-[2-chloropropene - (1)] - 3 - ethylbenzoxazolium salts. Four grams of 2 - acetylmethyl - 3 - ethylbenzoxazolium p-toluene sulfonate, which was prepared by reacting 2-acetylmethylbenzoxazole with ethyl p-toluene sulfonate in the manner described in Example V, was dissolved in 3 ml. phosphorus oxychloride. After the solution was permitted to stand at room temperature for 60 minutes, the excess phosphorus oxychloride was removed under vacuum at room temperature. The residue oil was extracted with ethyl ether, dissolved in 25 ml. methanol and precipitated by the addition of 20 ml. of a saturated solution of potassium iodide. The 2 - [2 - chloropropene - (1)] - 3-ethylbenzoxalium iodide was separated, filtered, washed with ethyl ether, boiled in benzene and filtered again. One and one-half grams of the product having a melting point of 175 to 176° C. was obtained.

*Analysis.*—$C_{12}H_{13}ClNOI$, percent: Calc'd, C, 41.23; H, 3.75; N, 4.01; Cl, 10.02. Found: C, 41.31, 41.47; H, 3.60, 3.60; N, 3.97, 4.29; Cl, 10.13, 10.18.

Example VIII

This example illustrates the preparation of 2-[2-chlorobutene - (1)] - 3 - methylbenzoxazolium salts. Five grams of 2 - propionylmethyl - 3 - methylbenzoxazolium p - toluene sulfonate, which was prepared by reacting 2 - propionylmethylbenzoxazole with methyl p-toluene sulfonate in the manner described in Example IV, was dissolved in 3 ml. of phosphorus oxychloride. After standing at room temperature for 60 minutes, the excess phosphorus oxychloride was removed at room temperature under vacuum. The oily residue was extracted with several portions of ethyl ether, dissolved in methanol and precipitated by the addition of saturated potassium iodide solution in acetone. Two grams of 2 - [2 - chlorobutene(1)] - 3 - methylbenzoxazolium iodide having a melting point of 174–175° C. was obtained.

Example IX

This example illustrates another method of preparing 2 - ($\beta$ - chloro - $\beta$ - phenyl) - vinyl - 3,5,6 - trimethylbenzoxazolium salts of the type described in Example I. Two and nine-hundredths grams (0.0071 mole) of 2-($\beta$-chloro - $\beta$ - phenyl) - vinyl - 5,6 - dimethylbenzoxazole and 1.29 grams (0.0071 mole) of methyl p - toluene sulfonate were heated slowly in an oil bath to a temperature of about 115 to 120° C. When the reaction temperature reached about 95° C., a mild exothermic reaction took place resulting in the reaction temperature rising about 4 to 6° C. After the temperature of the reactants reached 120° C., it was held 20 minutes, cooled and triturated with hot benzene, filtered and washed with ethyl ether. One and two-tenths grams of 2 - ($\beta$ - chloro-$\beta$ - phenyl) - vinyl - 3,5,6 - trimethylbenzoxazolium p-toluene sulfonate, melting point of 175 to 177° C., after one recrystallization from isopropanol, was obtained.

*Analysis.*—$C_{25}H_{24}ClNO_4S$, percent: Calc'd, C, 63.88; H, 5.15; N, 2.8; S, 6.82. Found: C, 63.85, 63.97; H, 5.25, 5.29; N, 2.67, 2.69; S, 6.44, 6.77.

Example X

This example illustrates the preparation of 2 - ($\beta$-chloro - $\beta$ - phenyl) - vinyl - 3 - methyl - 5- phenylbenzoxazolium iodide salt by the method described in Example IX. Five grams of 2 - ($\beta$ - chloro - $\beta$ - phenyl)-vinyl - 5 - phenylbenzoxazole was mixed with 10 cc. of methyl iodide and heated for 4 hours in a bomb on a steam bath. The resulting dark red solid was washed with ethyl ether, ground with ethyl ether, and dried. Four and one-half grams of 2 - ($\beta$ - chloro - $\beta$ - phenyl) - vinyl-3 - methyl - 5 - phenylbenzoxazolium iodide having a melting point of 194–196° C. was obtained.

Example XI

This example illustrates the preparation of 2-[2-chlorobutene - (1)] - 3,5,6 - trimethylbenzoxazolium salts. The technique described in Example VIII was repeated using 2 - propionylmethyl - 3,5,6 - trimethylbenzoxazolium p - toluene sulfonate which was prepared by reacting 2 - propionylmethyl - 5,6 - dimethylbenzoxazole with methyl p-toluene sulfonate in a manner described in Example IV, with phosphorus oxychloride. The oily residue of vacuum distillation was extracted with several portions of ethyl ether, dissolved in methanol and precipitated by the addition of a saturated potassium iodide solution in acetone. 2 - [2 - chlorobutene - (1)]-3,5,6 - trimethylbenzoxazolium iodide was obtained. The resultant products contained 44.13% carbon and 4.96% hydrogen (theoretical: 44.52% carbon and 4.54% hydrogen).

*Analysis.*—$C_{14}H_{17}ClNOI$.

Example XII

This example illustrates the preparation of 2-[2-chlorobutene - (1)] - 3 - ethylbenzoxazolium salts. The method described in Example VIII was repeated except that the 2 - propionylmethyl - 3 - methylbenzoxazolium p - toluene sulfonate was replaced by 2 - propionylmethyl - 3 - ethylbenzoxazolium p - toluene sulfonate resulting from the reaction of ethyl p - toluene sulfonate with 2 - propionylmethylbenzoxazole. The resultant 2-[2 - chlorobutene - (1)] - 3 - ethylbenzoxazolium iodide was obtained. 3.68% nitrogen (theoretical: nitrogen 3.86%).

*Analysis.*—$C_{13}H_{15}ClNOI$.

Example XIII

This example illustrates the preparation of a meso substituted carbocyanine dye having the structure

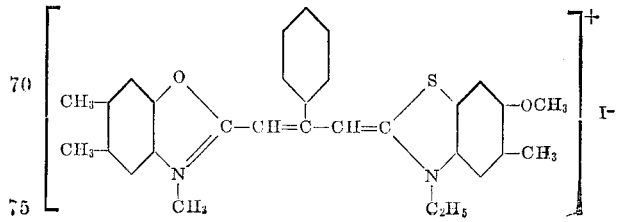

Four hundred and sixty-nine milligrams of 2-(β-chloro-β-phenyl)-vinyl-3,5,6-trimethylbenzoxazolium p-toluene sulfonate, 0.351 gram of 2,5-dimethyl-3-ethyl-6-methoxybenzthiazolium iodide and 1.5 ml. triethylamine were thoroughly mixed together at room temperature for ten minutes and the reactants were then in 14 ml. isopropanol. The reactants were then refluxed on a steam bath for ten minutes, cooled, filtered, brought to reflux twice in 10 ml. portion of isopropanol. Three-tenths gram of a pure dye corresponding to the above formula was formed representing a 50% yield. The dye had a λ max. 540 millimicrons in methanol and sensitized a silver halide emulsion at 610 millimicrons.

Example XIV

This example illustrates the preparation of a meso substituted carbocyanine dye having the structure:

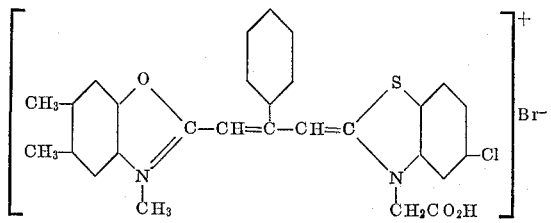

Four hundred and sixty-nine milligrams of 2-(β-chloro-β-phenyl)-vinyl-3,5,6-trimethylbenzoxazolium p-toluene sulfonate, 0.322 gram of 5-chloro-3-carboxymethyl-2-methylbenzthiazolium bromide and 10 drops of triethylamine were mixed together at room temperature for 15 minutes in 12 ml. isopropanol. The reactants were then refluxed on a steam bath for 10 minutes, cooled, filtered, brought to reflux in 10 ml. portions of isopropanol. Two-tenths grams of a pure dye corresponding to the above formula was formed. The dye had a λ max. 535 millimicrons in methanol and sensitized a silver halide emulsion at 585 millimicrons.

Example XV

This example illustrates the preparation of a meso substituted carbocyanine dye having the structure

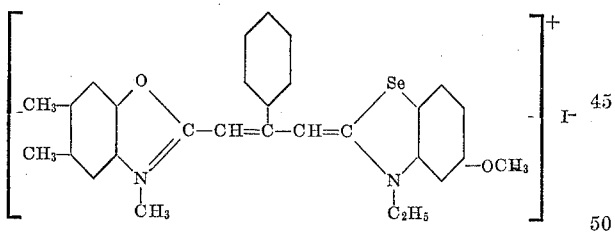

Four hundred and sixty-nine milligrams of 2-(β-chloro-β-phenyl)-vinyl-3,5,6-trimethylbenzoxazolium p-toluene sulfonate, 0.380 gram 3 - ethyl - 5-methoxy-2-methylbenzselenazolium iodide and ten drops of triethylamine were mixed at room temperature in 10 ml. isopropanol for 10 minutes, refluxed for 10 minutes on a steam bath and isolated in the manner described in Example I. Two-tenths gram of a pure dye corresponding to the above formula was formed representing a 45% yield. The dye had a λ max. 546 millimicrons in methanol and sensitized a silver halide emulsion at 620 millimicrons.

Example XVI

This example illustrates the reparation of a meso substituted carbocyanine dye having the structure

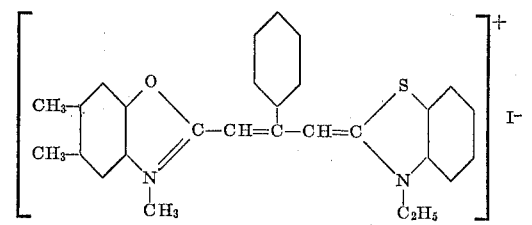

Four hundred and twenty-five milligrams of 2-(β-chloro-β-phenyl)-vinyl-3,5,6-trimethylbenzoxazolium iodide, 0.305 gram of 3-ethyl-2-methylbenzthiazolium iodide and 0.5 ml. triethylamine were mixed in 13 ml. isopropanol at room temperature for 10 minutes and then heated on a steam bath for 10 minutes. The reactants were cooled, filtered and dried yielding 0.390 gram of the above dye. After one recrystallization from isopropanol, 0.310 gram of the purified dye having a melting point of 260° C. was obtained. The dye had a λ max. of 532 millimicrons in methanol.

Example XVII

This example illustrates the preparation of a meso substituted carbocyanine dye having the structure

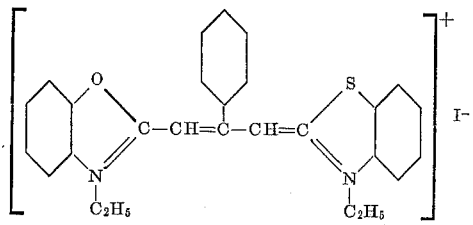

Three hundred and ninety-seven milligrams 2-(β-chloro-β-phenyl)-vinyl-3-methylbenzoxazolium iodide, 0.305 gram 2-methyl-3-ethylbenzothiazolium iodide and 15 drops of triethylamine were mixed in 15 ml. isopropanol at room temperature for 10 minutes and then heated on a steam bath for 15 minutes. The reactants were cooled, filtered, washed with ethyl ether and recrystallized from isopropanol. Three hundred milligrams of the purified dye was obtained having a melting point of 223–224° C. and λ max. 524 millimicrons in methanol.

Example XVIII

This example illustrates the preparation of a meso substituted carbocyanine dye having the structure

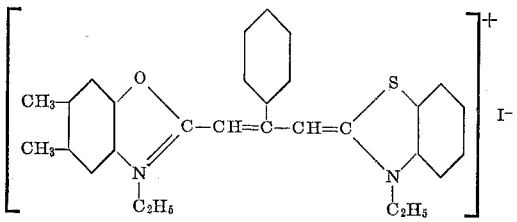

Four hundred thirty-nine milligrams 2 - (β - chloro-β-phenyl) - vinyl-5,6-dimethyl-3-ethylbenzoxazolium iodide, 0.365 gram 2-methyl-3-ethylbenzothiazolium iodide and 0.5 ml. triethylamine were mixed in 7 ml. ethanol at room temperature for 10 minutes and then heated on a steam bath for 10 minutes. The reactants were cooled, filtered, washed in ethyl ether and yielded 0.330 grams of pure dye having a melting point of 264–265° C. and λ max. 530 millimicrons in methanol.

Example XIX

This example illustrates the preparation of a meso substituted carbocyanine dye having the structure

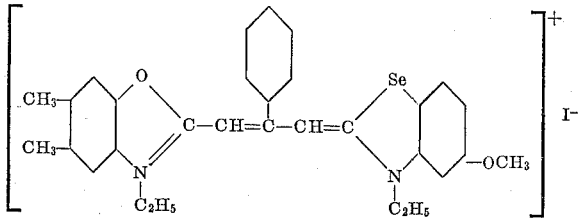

Example XVI was repeated except that 0.380 gram 2-methyl-3-ethyl-5-methoxybenzoselenazolium iodide was used in place of the benzothiazolium salt. After one recrystallization from ethanol, 0.250 gram of pure dye was obtained having a melting point of 251–252° C. and λ max. 547 millimicrons in methanol.

Example XX

This example illustrates the preparation of a meso substituted carbocyanine dye having the structure

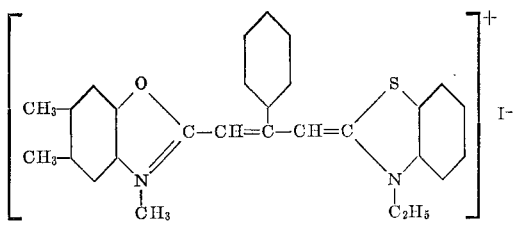

Three hundred and fifty milligrams 2-[2-chloropropene (1)]-3,5,6-trimethylbenzoxazolium iodide, 0.305 gram 2-methyl-3-ethylbenzthiazolium iodide and 10 drops triethylamine were stirred in 15 ml. isopropanol at room temperature for 5 minutes and then heated on a steam bath for 10 minutes. The reactants were cooled and the liquor decanted off. The semi-solid was dissolved in little methanol, filtered and cooled yielding the pure dye having a melting point of 232–234° C. and λ max. 520 in methanol.

Example XXI

This example illustrates the preparation of a meso substituted carbocyanine dye having the structure

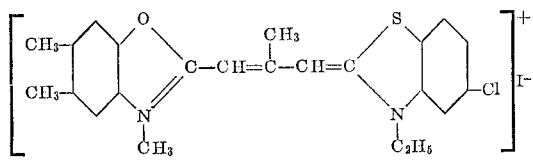

Two hundred fifty milligrams 2-[2-chloropropene(1)]-3,5,6-trimethylbenzoxazolium iodide, 0.230 gram 2-methyl-3-ethyl-5-chlorobenzthiazolium iodide and 15 drops triethylamine were mixed in 20 ml. isopropanol at room temperature for 5 minutes and heated on a steam bath for 15 minutes. The reactants were cooled, filtered, washed with ethyl ether and yield 0.280 gram pure dye having a melting point of 270–271° C. and λ max. 521 millimicrons in methanol.

Example XXII

This example illustrates the preparation of a meso substituted carbocyanine dye having the structure

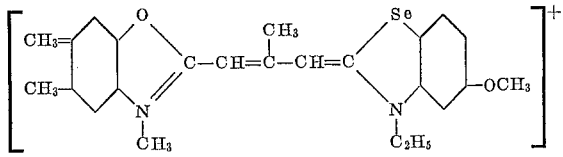

Three hundred seventy milligrams 2-[2-chloropropene-(1)]-3,5,6-trimethylbenzoxazolium iodide, 0.380 gram 2-methyl-3-ethyl-5-methoxybenzoselenazolium iodide and 15 drops triethylamine were mixed at room temperature in 20 ml. isopropanol for 5 minutes and heated on a steam bath for 5 minutes. The reactants were cooled, filtered, washed with ethyl ether and yielded 0.200 gram pure dye having a melting point of 213–215° C. and λ max. 532 millimicrons in methanol.

Example XXIII

This example illustrates the preparation of a meso substituted carbocyanine dye having the structure

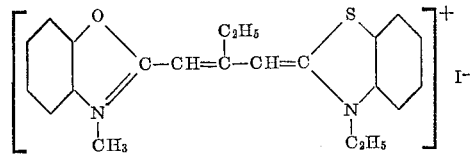

Three hundred forty milligrams 2-[2-chlorobutene-(1)]-3-methylbenzoxazolium iodide, 0.348 gram 2-methyl-3-ethylbenzthiazolium iodide and 4 drops triethylamine were mixed in 15 ml. isopropanol for 5 minutes and heated on a steam bath for 15 minutes. The reactants were cooled, filtered and washed with ethyl ether yielding 0.310 gram of product having a melting point of 200° C. The product was boiled with isopropanol, cooled and filtered yielding pure dye having melting point 250° C. and λ max. 514 millimicrons in methanol.

Example XXIV

A dye having the structure

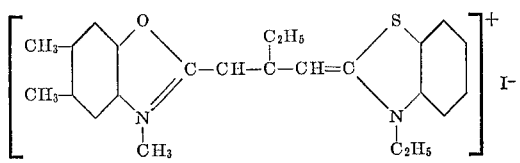

was obtained by repeating Example XXIII using an equivalent amount of 2 - [2 - chlorobutene-(1)]-3,5,6-trimethylbenzoxazolium iodide in place of 2-[2-chlorobutene-(1)]-methylbenzoxazolium iodide. The dye had λ max. 520 millimicrons in methanol.

Example XXV

A dye having the structure

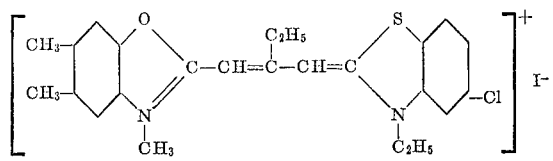

was obtained by repeating Example XXIV using an equivalent amount of 2-methyl-3-ethyl-5-chlorobenzthiazolium iodide in place of 2-methyl-3-ethylbenzthiazolium iodide. The dye had λ max. 526 millimicrons in methanol.

Example XXVI

A dye having the structure

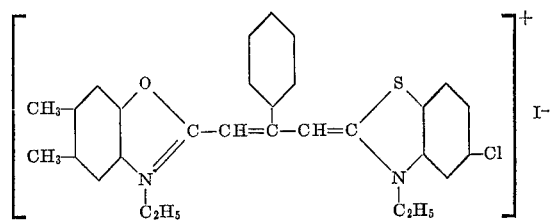

was ovtained by reepating Example XXV using an equivalent amount of 2-(β-chloro-β-phenyl)-3-ethyl-5,6-dimethylbenzoxazolium iodide in place of 2-[2-chlorobutene-(1)]-3,5,6-trimethylbenzoxazolium iodide. The dye had λ max. 533 millimicrons in methanol.

Example XXVII

A dye having the structure

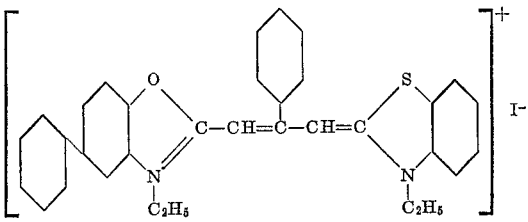

was prepared by repeating Example XXIII using an equivalent amount of 2-(β-chloro-β-phenyl)-3-ethyl-5-phenylbenzoxazolium iodide in place of 2-[2-chlorobutene-(1)]-3-methylbenzoxazolium iodide. The dye had λ max. 530 millimicrons in methanol.

Example XXVIII

A dye having the structure

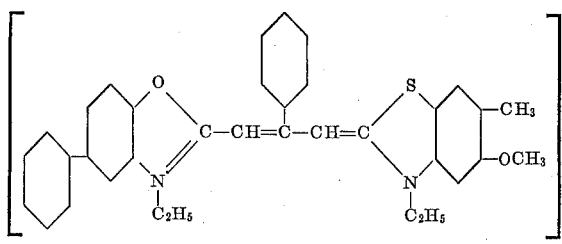

was obtained by repeating Example XXVII using an equivalent amount of 2,6-dimethyl-3-ethyl-5-methoxybenzothiazolium iodide in place of 2-methyl-3-ethylbenzothiazolium iodide. The dye had λ max. 540 in methanol.

Example XXIX

A dye having the structure

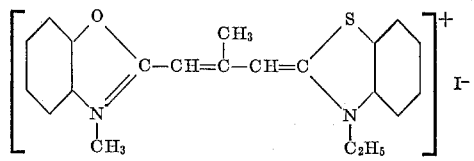

was obtained by repeating Example XXIII using an equivalent amount of 2-[2-chloropropene-(1)]-3-methylbenzoxazolium iodide in place of 2-[2-chlorobutene-(1)]-3-methylbenzoxazolium iodide. The dye had λ max. 514 in methanol.

Example XXX

A dye having the structure

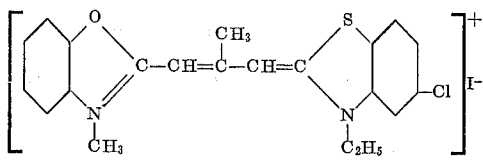

was obtained by repeating Example XXIX using an equivalent amount of 2-methyl-3-ethyl-5-chlorobenzthiazolium iodide in place of 2-methyl-3-ethylbenzthiazolium iodide. The dye had λ max. 516 in methanol.

Example XXXI

A dye having the structure

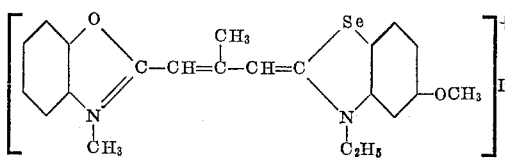

was obtained by repeating Example XXIX using an equivalent amount of 2-methyl-3-ethyl-5-methoxybenzoselenazolium iodide in place of 2-methyl-3-ethylbenzothiazolium iodide. The dye had λ max. 527 in methanol.

Example XXXII

A dye having the structure

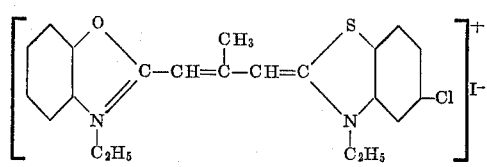

was obtained by repeating Example XXX using an equivalent amount of 2-[2-chloropropene-(1)]-3-ethylbenzoxazolium iodide in place of 2-[2-chloropropene-(1)]-3-methylbenzoxazolium iodide. The dye had λ max. 518 in methanol.

Example XXXIII

A dye having the structure

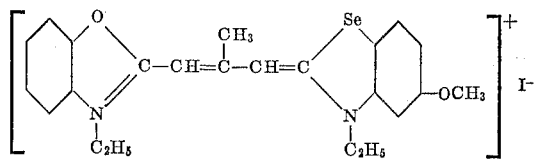

was obtained by repeating Example XXXI using an equivalent amount of 2-[2-chloropropene-(1)]-3-ethylbenzoxazolium iodide in place of 2-[2-chloropropene-(1)]-3-methylbenzoxazolium iodide. The dye had λ max. 528 in methanol.

Example XXXIV

A dye having the structure

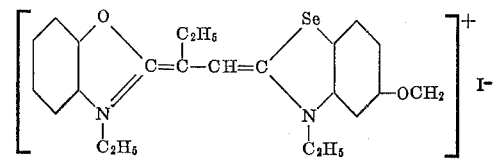

was obtained by repeating Example XXXI using an equivalent amount of 2-[2-chlorobutene-(1)]-3-ethylbenzoxazolium iodide in place of 2-[2-chloropropene-(1)]-3-methylbenzoxazolium iodide. The dye had λ max. 528 in methanol.

Example XXXV

A dye having the structure

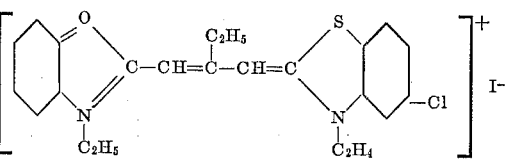

was obtained by repeating Example XXX using an equivalent amount of 2-[2-chlorobutene-(1)]-3-ethylbenzoxazolium iodide in place of 2-[-2-chloropropene-(1)]-3-methylbenzoxazolium iodide. The dye had λ max. 520 in methanol.

Example XXXVI

A dye having the structure

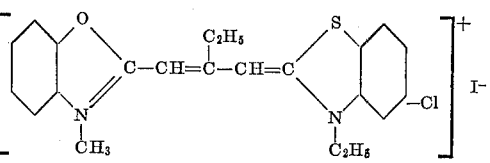

was obtained by repeating Example XXX using an equivalent amount of 2-[2-chlorobutene-(1)]-3-methylbenzoxazolium iodide in place of 2-[2-chloropropene-(1)]-3-methylbenzoxazolium iodide. The dye had λ max. 516 in methanol.

Example XXXVII

A dye having the structure

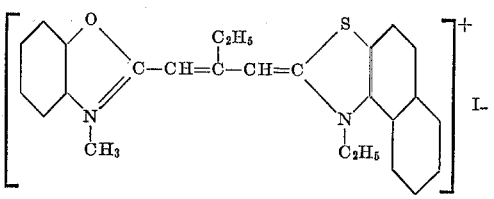

was obtained by repeating Example XXXVI using an equivalent amount of 2-methyl-3-ethylnaphtho (1.2) thiazolium iodide in place of 2-methyl-3-ethyl-5-chlorobenzothiazolium iodide. The dye had λ max. 530 in methanol.

Example XXXVIII

A dye having the structure

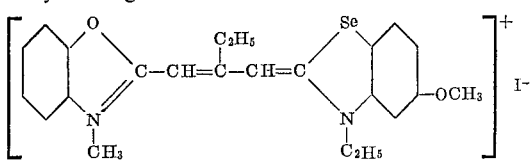

was obtained by repeating Example XXXI using an equivalent amount of 2-[2-chlorobutene-(2)]-3-methylbenzoxazolium iodide in place of 2-[2-chloropropene-(1)]-3-methylbenzoxazolium iodide. The dye had λ max. 526 in methanol.

Example XXXIX

An unsymmetrical meso substituted oxaoxacarbocyanine dye having the structure

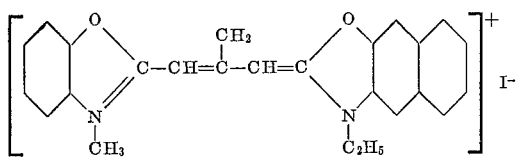

was obtained by repeating Example XXXI using an equivalent amount of 2-methyl-3-ethylnaphtho (2.3) oxazolium iodide in place of 2-methyl-3-ethylbenzothiazolium iodide. The dye had λ max. 494 in methanol.

Example XL

An unsymmetrical meso substituted oxaoxacarbocyanine dye having the structure

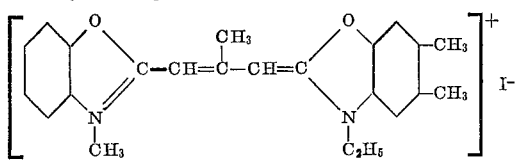

was obtained by repeating Example XXXI using an equivalent amount of 2,5,6 - trimethyl - 3 - ethylbenzoxazolium iodide in place of 2 - methyl - 3 - ethylbenzothiazolium iodide. The dye had λ max. 492 in methanol.

The procedure illustrated by XXXIX and XL provides for the first time a method for the synthesis of meso-substituted unsymmetrical oxacarbocyanines.

These dyes are represented by the following general formula:

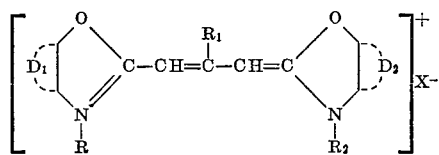

wherein R, $R_1$ and $R_2$ have the values given above, and may be alike or different and $D_1$ and $D_2$ represent different divalent ortho arylene groups, and X is an anion.

Variations and modifications can be made in the procedures, compositions and materials described without departing from the scope or spirit of this invention.

We claim:
1. A compound having a structure

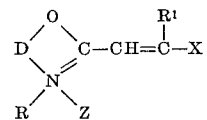

wherein D is an ortho divalent arylene group selected from the class consisting of phenylene, naphthylene, mono- and dialkyl-phenylene, of which the alkyl groups contain 1 to 8 carbon atoms, chlorophenylene, phenylphenylene and 2¹-thienyl phenylene, the substituents of mono-substituted phenylene groups occupying the 5-position of the resultant benzoxazole nucleus and the alkyl groups of the dialkyl phenylene group occupying the 5- and 6-positions of the resultant benzoxazole nucleus; X is a halogen selected from the group consisting of chlorine and bromine; R is an alkyl group of 1 to 3 carbon atoms; $R^1$ is a radical selected from the group consisting of chloromethyl, alkyl of 1 to 17 carbon atoms, phenyl, chlorophenyl, tolyl and naphthyl; and Z is an anion selected from the group consisting of Cl⁻, Br⁻, I⁻, $SO_4.CH_3^-$, $SO_4.C_2H_5^-$, and $SO_3C_6H_4.CH_3^-$.

2. A compound as defined in claim 1 wherein $R^1$ is phenyl.

3. A compound as defined in claim 1 wherein $R^1$ is an alkyl group of 1 to 17 carbon atoms.

4. A compound as defined in claim 1 wherein X is chlorine.

5. A compound as defined in claim 4 wherein Z is an iodide anion.

6. A compound as defined in claim 3 wherein $R^1$ is methyl.

7. A compound as defined in claim 3 wherein $R^1$ is ethyl.

8. A compound as defined in claim 4 wherein $R^1$ is phenyl and

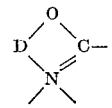

represents a 5-phenyl benzoxazole radical.

9. A compound as defined in claim 4 wherein $R^1$ is phenyl and

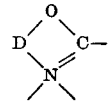

represents a 5, 6-dimethyl benzoxazole radical.

References Cited

UNITED STATES PATENTS

| | | | |
|---|---|---|---|
| 3,044,875 | 7/1962 | Gotze | 260—240 |
| 2,231,659 | 2/1941 | Brooker et al. | 260—240 |

HENRY R. JILES, *Primary Examiner.*

H. I. MOATZ, *Assistant Examiner.*